United States Patent Office 3,386,921
Patented June 4, 1968

3,386,921
GELS AND METHODS OF PRODUCING SAME
Richard G. Schweiger and John J. O'Connell, San Diego, Calif., assignors to Kelco Company, San Diego, Calif., a corporation of Delaware
No Drawing. Filed Apr. 25, 1963, Ser. No. 275,504
7 Claims. (Cl. 252—316)

This invention relates to useful aqueous gels employing algin alkylcarboxylates and preferably algin acetate.

It is well known that algin can be made to react with calcium and some other ions to produce gels. These can be utilized in food, pharmaceutical, cosmetic and industrial applications. A limitation exists in that the amount of the ion used that produces this gelation is quite critical. Comparatively, very small changes in the ratio of the ion to the algin can change the gel either to a very weak one, in one case, or a tough gel that bleeds fluid. In the case of calcium, just the calcium in a moderately hard water will cause a substantial difference compared to that in a fairly soft water when these two waters are used with the same gel formula. It is obvious that a product which was not this sensitive would be very much more valuable in the market where it is impossible to be sure what type of water will be used.

An object of the present invention is to provide a method for producing gels of an algin derivative which are materially less sensitive to calcium ion concentration; and to provide the gels thereby formed.

Another object of the invention is to provide gels of the type described which are likewise materially less sensitive to other divalent ions.

Other objects of the invention will appear as the description thereof proceeds.

In the co-pending application of one of us, Ser. No. 113,082, filed May 29, 1961 and now abandoned, of Richard G. Schweiger and entitled "Algin Acetates and Process of Making the Same," the disclosure of which is incorporated herein by reference; and also in the publication of one of us entitled "Acetylation of Alginic Acid," published in the Journal of Organic Chemistry, volume 27, pages 1786–1791 (1962), the entire disclosure of which is likewise herein incorporated by reference, there is taught a method of making a highly water soluble and water dispersible algin acetate, wherein a wide range of degrees of acetylation is possible. Because of the chemical nature of alginic acid, a theoretically maximum degree of acetylation (herein occasionally abbreviated as D.S. for degree of substitution) of 2.0 is possible. The method just referred to permits a practical achievement of 1.85 for the D.S., without appreciable degradation of the alginic acid polymer. Generally speaking, in accordance with this method of making the alginic acid acetate, an alginic acid of substantial purity is adjusted so as to contain a slight amount of water, preferably from 10 to 20 percent by weight, and is then introduced into a mixture of acetic acid and acetic anhydride. Perchloric acid is then introduced into this mixture, its function being that of a catalyst. When the perchloric acid is added, the reaction commences at an appreciable rate, with a consequent increase in temperature. We prefer to add the perchloric acid in small increments, so that the temperature of the reaction mixture does not exceed about 40° C. For the same reason, we prefer to add only about two-thirds of the calculated amount of acetic anhydride to the starting reaction mixture, and add the final one-third of the necessary acetic anhydride in small increments along with the perchloric acid. In general, the amount of acetic acid to be used is approximately 0 to 4 times that of the weight of alginic acid (dry basis) used and its function is that of a diluent. The amount of acetic anhydride is 3 to 6 times by weight of the alginic acid (same basis) and is adjusted depending on the D.S. desired. This amount of anhydride will provide an excess for acetylation and also enough anhydride to react with the water present. The amount of perchloric acid necessary is from about 1% to 2% by weight of the alginic acid.

We have found that the presence of metallic salts in the alginic acid, commonly those of calcium, make it necessary to use more perchloric acid than would otherwise be the case, so that it is more satisfactory all around to use an alginic acid which has previously been purified so that its ash content is less than 1.5% by weight, and indeed preferably in the range 0.3 to 1.0%.

In the foregoing, we have mentioned that the alginic acid should contain a slight amount of water, preferably from 10 to 25% by weight. Care must be taken to see that this low amount of water remains uniformly distributed, and therefore ordinary drying methods are not desirable. In examples of our invention hereinafter set forth we show the use of glacial acetic acid as a means of reducing the moisture present in the alginic acid. In lieu thereof, we may use acetone or freeze drying as a means of reducing the moisture content of the alginic acid. Still further, solvents other than acetone may also be used for said purpose, provided however they do not react with the acetic anhydride.

In order to make algin acetate gels in accordance with the present invention, we first provide an algin acetate, which is best made in accordance with the procedure just given, having a D.S. within the range of 0.1 and 1.1, and preferably within the range 0.3 to 0.7. The optimum D.S. will vary somewhat from one particular application to another and will be dependent upon a number of factors including the pH, the metallic ion used and expected, the presence of phosphates, other dissolved materials, and the like. Nevertheless, the optimum D.S. will be found within the broad range just stated.

In order to produce the gels in accordance with the invention we prefer to use a slowly soluble calcium compound to avoid any localized high concentration upon addition to the algin acetate solution. The amount of calcium required to provide gelation varies with the D.S. and concentration of the algin acetate and the strength of the gel desired. For a concentration of 1% and a D.S. of 0.3, calcium must be used at approximatedly 0.5 milliequivalent per gram of algin to produce the softest gel. For a D.S. of 0.6, 1 milliequivalent must be used, and for a D.S. of 0.7, 2 milliequivalents must be used. When calcium gluconate is used as the source, 1 milliequivalent corresponds to about 0.22 gram.

To illustrate that the calcium senstivity is materially reduced, we made a series of gels using 1% algin acetate in water, the algin acetate having varying D.S.'s. Calcium gluconate was dispersed in varying concentrations between 0.1 gram to 2 grams per gram of algin acetate in a 1% solution. Critic acid was used to maintain a standard pH of 4.0 to simulate fruit flavor gels. A gel strength of 20–30 on an arbitrary scale determined with a Bloom gelometer was found to be the most acceptable by a taste panel. When we increased the calcium gluconate by 0.09 gram per gram of algin over the level of calcium gluconate required to give a gel strength of 20, we found a striking difference over ordinary sodium alginate. By this procedure the sodium alginate gel strength increased to 70, was tough, and bled. An algin acetate of a D.S. of 0.6 changed from 20 to 27.5, and one of a D.S. of 0.7 changed from 20 to 21. These were both gels of good eating quality. This increase of 0.09 gram of calcium gluconate corresponds to a water hardness of 200 p.p.m. as calcium carbonate. Thus, the improvement in accordance with the invention may be readily seen. The gels produced were useful in themselves as edible gels and were susceptible to the inclusion of sugar or saccharin or flavoring without significant change in the other properties whereby pleasant edible dessert gels were produced.

As a practical matter, we employ between 0.3% of algin acetate and 3% of algin acetate in the aqueous solution dependent upon the strength of the gel desired. It will be understood that this range of concentration corresponds to a very wide range of comparative gel strengths indeed.

It is also to be observed that the gels may be made with some other ions such as nickel ion, copper ion, cobalt ion, zinc ion, or barium ion, or mixtures of these. Also, any combination of these with calcium ion may be used. Furthermore, a gel made in the first instance with any of these or with a mixture of any of these, will be found likewise less sensitive to the further addition of any of the others when added thereto, so that the benefits of the invention will be obtained. Thus, for example, the gel may be made with 1% algin acetate having a D.S. of 0.7, with an addition of 1% calcium gluconate. The gel thus produced will be less sensitive to additions of soluble barium, cobalt, copper, nickel and zinc salts as well as calcium salts. Likewise the same system can be put together using barium carbonate instead of calcium gluconate. The gel so produced will be less sensitive to later additions of soluble calcium salts as well as soluble barium salts and the others.

It will be apparent that while we have described our invention with the aid of numerous specific examples, using particular materials and specific concentrations and the like, our invention is essentially abroad one and numerous changes in detail, manner of procedure, and the like are possible within the broad scope thereof, as defined by the claims which follow. Thus, for example, instead of using algin acetate as the algin alkylcarboxylate we may make our gels with algin propionate or with algin butyrate. It will be recognized that these are alkylcarboxylates in which the alkyl group has respectively two and three carbon atoms. It will also be apparent that in order to make such compounds it is only necessary to substitute in the procedure heretofore given in col. 1 hereof calling for acetic acid and acetic anhydride the use of propionic acid and propionic anhydride or butyric acid and butyric anhydride, respectively.

We claim:

1. A composition of matter consisting essentially of water, from 0.3 to 3.0% of a water soluble algin alkylcarboxylate having a D.S. within the range 0.1 to 1.1, and a compound furnishing a divalent ion chosen from the group consisting of calcium, zinc, cobalt, nickel, copper, and barium at a concentration of said divalent ion of at least 0.5 milliequivalent/gram of algin alkylcarboxylate.

2. A composition of matter consisting essentially of water, from 0.3 to 3.0% of a water soluble algin acetate having a D.S. within the range 0.1 to 1.1, and a compound furnishing a divalent ion chosen from the group consisting of calcium, zinc, cobalt, nickel, copper, and barium at a concentration of said divalent ion of at least 0.5 milliequivalent/gram of algin acetate.

3. The composition in accordance with claim 2 wherein said divalent ion is calcium.

4. A composition of matter consisting essentially of water, from 0.3 to 3.0% of a water soluble algin propionate having a D.S. within the range of 0.1 to 1.1, and a compound furnishing a divalent ion chosen from the group consisting of calcium, zinc, cobalt, nickel, copper, and barium at a concentration of said divalent ion of at least 0.5 milliequivalent/gram of algin propionate.

5. A composition of matter consisting essentially of water, from 0.3 to 3.0% of a water soluble algin butyrate having a D.S. within the range of 0.1 to 1.1, and a compound furnishing a divalent ion chosen from the group consisting of calcium, zinc, cobalt, nickel, copper, and barium at a concentration of said divalent ion of at least 0.5 milliequivalent/gram of algin butyrate.

6. The process of producing an aqueous gel materially less sensitive to the addition of divalent ions which comprises, adding to water from 0.3 to 3.0% of a water soluble algin acetate having a D.S. within the range 0.1 to 1.1 and, without respect to the order of addition, adding a compound furnishing a divalent ion chosen from the class consisting of calcium, zinc, cobalt, nickel, copper, and barium to an extent sufficient to provide a concentration of said divalent ion of at least 0.5 milliequivalent/gram of algin acetate.

7. The process of claim 6 in which said divalent ion is calcium.

References Cited

UNITED STATES PATENTS

| | | | |
|---|---|---|---|
| 2,420,308 | 5/1947 | Gates | 252—316 |
| 2,589,226 | 3/1952 | Carson | 260—209.6 X |

OTHER REFERENCES

Nature, Oct. 19, 1946, page 553.
Chemical Abstracts, vol. 40, 1946, column 7164 [9].

LEON D. ROSDOL, *Primary Examiner.*

JULIUS GREENWALD, ALBERT T. MEYERS, MURRAY KATZ, *Examiners.*

R. D. LOVERING, *Assistant Examiner.*